United States Patent
Chen

(10) Patent No.: US 9,459,408 B2
(45) Date of Patent: Oct. 4, 2016

(54) CABLE SPLICING FIXTURE

(71) Applicant: Verizon Patent and Licensing Inc., Basking Ridge, NJ (US)

(72) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 425 days.

(21) Appl. No.: 14/017,521

(22) Filed: Sep. 4, 2013

(65) Prior Publication Data

US 2015/0063766 A1    Mar. 5, 2015

(51) Int. Cl.
G02B 6/255    (2006.01)
G02B 6/44    (2006.01)

(52) U.S. Cl.
CPC ........... *G02B 6/2555* (2013.01); *G02B 6/4471* (2013.01); *Y10T 29/49895* (2015.01)

(58) Field of Classification Search
CPC .................................................. G02B 6/2555
USPC ........................................................ 385/97
See application file for complete search history.

(56) References Cited

U.S. PATENT DOCUMENTS

| | | | |
|---|---|---|---|
| 2005/0081397 A1* | 4/2005 | Bonham | G02B 6/32 33/645 |
| 2014/0133818 A1* | 5/2014 | Huang | G02B 6/3636 385/134 |
| 2014/0198520 A1* | 7/2014 | Bennett | G02B 6/001 362/556 |
| 2014/0314382 A1* | 10/2014 | Sato | G02B 6/4403 385/103 |

* cited by examiner

*Primary Examiner* — Jerry Blevins

(57) ABSTRACT

An alignment fixture is configured to receive a group of optical fibers with each of the optical fibers having a coating and a bare fiber end. The fixture includes a first end configured to permit insertion of the optical fibers into a body of the fixture and a second end configured to align the bare fiber ends of the optical fibers in a particular arrangement. The fixture includes channels extending from the first end to the second end. An insertion point of each channel is at least twice the diameter of a coating of the one of the optical fibers. An exit point of each channel is narrower than the insertion point and is configured to position the bare fiber end of the optical fiber in the particular arrangement within a desired tolerance relative to other optical fibers. The alignment fixture enables easy splice alignment and protection in the field.

20 Claims, 10 Drawing Sheets

CABLE SPLICING FIXTURE

BACKGROUND

Fiber optic cables are used for providing telecommunication services to business and residential locations. Ribbon fiber may include multiple individual fibers arranged in an equal-spaced parallel array wrapped in a single cable. In field operations, technicians may terminate a ribbon fiber or splice one ribbon fiber to another ribbon fiber by handling the ribbon fiber as one multi-fiber group. In some cases, it is desirable to transition from a group of individual completely separated fiber cables to a multi-fiber ribbon cable. Splicing multiple loose fibers to a ribbon fiber cable has proved to be a difficult operation for field technicians. These splices require the proper alignment of multiple individual fibers to match a ribbon pattern. This process may be performed by placing fibers in a fiber arrangement tool, or to ribbonize it to match the ribbon fiber first, which can be a tedious field operation, particularly when cold temperatures or other conditions degrade a technician's fine motor skills.

DETAILED DESCRIPTION OF PREFERRED EMBODIMENTS

The following detailed description refers to the accompanying drawings. The same reference numbers in different drawings may identify the same or similar elements.

Systems and methods described herein may use an alignment fixture to simplify alignment of loose optical fibers into a ribbon alignment. The alignment fixture may accept loose, stripped fibers through enlarged back-end openings and funnel the individual fibers into a ribbon arrangement at a set of front-end openings. The alignment fixture may secure the individual fibers in the ribbon arrangement from which the fibers may be cleaved. The alignment fixture, with the cleaved fibers may then be terminated or spliced as needed. For example, the alignment fixture with the cleaved fibers may be fusion spliced to another ribbonized fiber, put onto a terminator, or put on a fixture for mechanical splicing.

In one implementation, an alignment fixture may be configured to receive a group of optical fibers with each of the optical fibers having a coating and a bare fiber end. The alignment fixture may include a first end to permit insertion of the optical fibers into a body of the alignment fixture and a second end configured to align the bare fiber ends of the optical fibers in a particular arrangement (e.g., a ribbon arrangement). The alignment fixture includes channels extending from the first end to the second end, with each of the channels including an insertion point at the first end to receive one of the optical fibers and an exit point at the second end. The insertion point may be at least twice the diameter of a coating of the one of the optical fibers. The exit point may be narrower than the insertion point and may be configured to position the bare fiber end of the optical fiber in the particular arrangement within a desired tolerance relative to other optical fibers. The alignment fixture enables easy splice alignment in the field and protection of completed splices.

Figure 1:
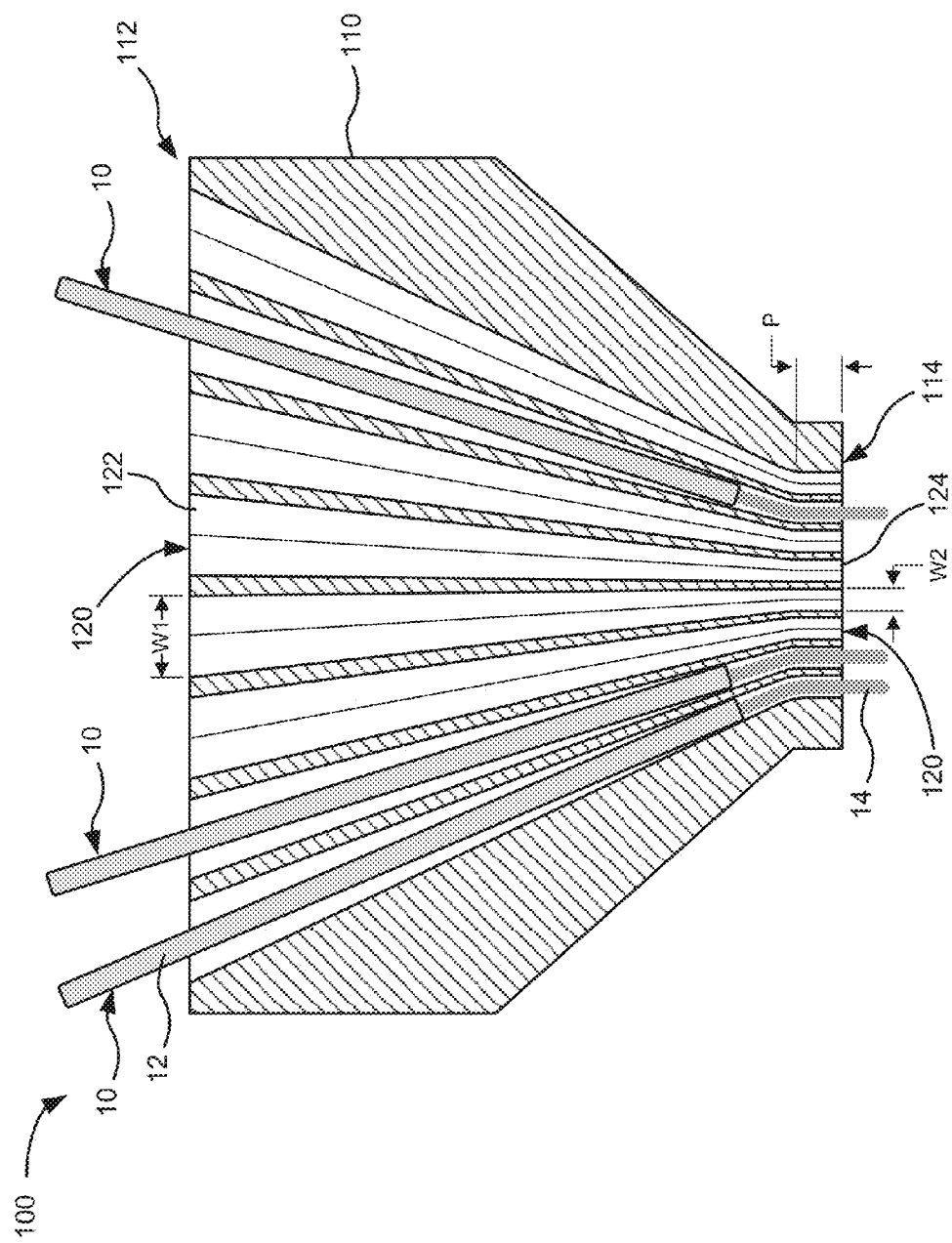
FIG. 1 is a schematic top cross-sectional diagram of an alignment fixture according to an implementation described herein.

FIG. 1 provides a schematic top cross-sectional diagram of an alignment fixture 100 according to an implementation described herein. Alignment fixture 100 may include a body 110 with multiple channels 120-1 though 120-$n$ (herein referred to collectively as "channels 120" and generically as "channel 120") to receive optical fibers 10.

Optical fibers 10 may include fibers for communication networks such as 10 Gigabyte Ethernet (GbE) networks or 40 GbE networks. Optical fibers 10 may generally include a protective coating 12 or buffer surrounding silica cladding and core portions. The cladding and core portions are referred to herein collectively as bare fiber 14. In some implementations, optical fibers 10 may conform to standards for Quad Small Form Factor Pluggable (QSFP) cabling. Optical fibers 10 may include standard diameter fibers or non-standard diameter fibers. In an exemplary implementation, optical fiber 10 may have a coating 12 diameter of 240-250 microns and a bare fiber diameter of 125 microns. In systems and methods described herein, optical fibers 10 are generally presumed to have protective coating 12 removed (e.g., stripped) from an end of optical fiber 10 to expose a span of bare fiber 14 (e.g., about one inch in length) prior to being used with alignment fixture 100.

Body 110 may generally be a relatively rigid molded plastic component. For example, body 110 may be molded from a thermoplastic polymer, such as polyphenylene sulfide (PPS), or a thermoset polymer. Body 110 may include a fiber insertion end 112 and a fiber alignment end 114. Channels 120 may extend though body 110 from insertion end 112 to fiber alignment end 114. In one implementation, one or more surfaces of channels 120 may be lined with metal or a coating. Generally, body 110 may be configured to permit optical fibers 10 to be inserted (e.g., pushed) into channels 120 at fiber insertion end 112. Each fiber 10 may be guided through a channel 120 to fiber alignment end 114. In the configuration shown in FIG. 1, eight channels 120 are shown to align up to eight fibers in a ribbon arrangement. In other implementations, a different number of channels 120 may be used to provide different numbers of aligned fibers. For example, four, twelve, or twenty-four channels 120 may be used.

Channels 120 may be arranged at fiber alignment end 114 so that optical fibers 10 inserted therethrough are aligned in a particular pattern, such as a ribbon pattern, with optical fibers 10 positioned side-by-side. In one implementation, fiber alignment end 114 may be configured to match standard connector patterns, such as known multiple-fiber push-on (MPO) connectors. For example, fiber alignment end 114 may include a female guide hole configuration (not shown) to receive alignment pins and/or ferrules from a corresponding male MPO connector.

Each channel 120 may include an insertion point 122-1 to 122-n ((herein referred to collectively as "insertion points 122" and generically as "insertion point 122") at fiber insertion end 112 to receive one of the optical fibers 10. Generally, insertion point 122 may be sized to permit a technician to easily guide fiber 10 into channel 120. For example, a width, W1, of insertion point 122 may be two, three, or more times the cross-sectional diameter of fiber 10. In an exemplary implementation, if optical fibers 10 have a 250 micron diameter coating 12, width W1 may be 900 microns.

Each channel 120 may also include an exit point 124 at fiber alignment end 114 from which one of the optical fibers 10 may extend through. Exit points 124 may be arranged with equal spacing along a horizontal line (e.g., in the orientation shown in FIG. 1) to match, for example, a standard ribbonized pattern. Generally, exit point 124 may be sized to position one of optical fibers 10 in a particular alignment (e.g., a ribbon arrangement) within a required tolerance relative to other optical fibers 10. In one example, the width, W2, of exit point 124 may be less than two times the cross-sectional diameter of fiber 10. In another example, the width, W2, of exit point 124 may be to slightly larger than the cross-sectional diameter of fiber 10 (e.g., with enough clearance to allow for sliding of fiber 10 within channel 120). In one example, width W2 at exit points 124 may be 2 to 5 microns more than the diameter of bare fiber 14. In one implementation, exit points 124 may collectively align optical fibers 10 in a ribbonized alignment and perpendicular to fiber alignment end 114 in accordance with a known standard, such as one or more standards for multi-fiber push-on (MPO) connectors. Particularly, exit points 124 may align optical fibers 10 in an MPO 12-fiber or 24-fiber arrangement.

In one implementation, channel 120 may gradually taper from the width, W1, at insertion point 122 to the width, W2, at exit point 124. The taper may be configured to provide an insertion stopping point for coating 12 (e.g., at a point where the width of channel 120 matches the diameter of coating 12), while bare fiber 14 may continue through the rest of channel 120 to exit point 124. In other implementations, as shown in FIG. 1, channel 120 may gradually taper from the width, W1, at insertion point 122 to the width, W2, at a point prior to exit point 124. Thus, channel 120 may include a portion, P, with a consistent width W2 to provide stable alignment of fiber 10 with a parallel bare fibers 14 extending from fiber alignment end 114. In still other implementations, channel 120 may include another portion (not shown) extending from insertion point 122 with a consistent width W1. Thus, channel 120 may include one or more portions of a fixed width, with a middle portion that gradually tapers between the two fixed-width portions. Channel 120 may be configured to provide smooth transitions between portions to prevent any kinks in optical fiber 10 when optical fiber 10 is inserted through channel 120.

Figure 2:
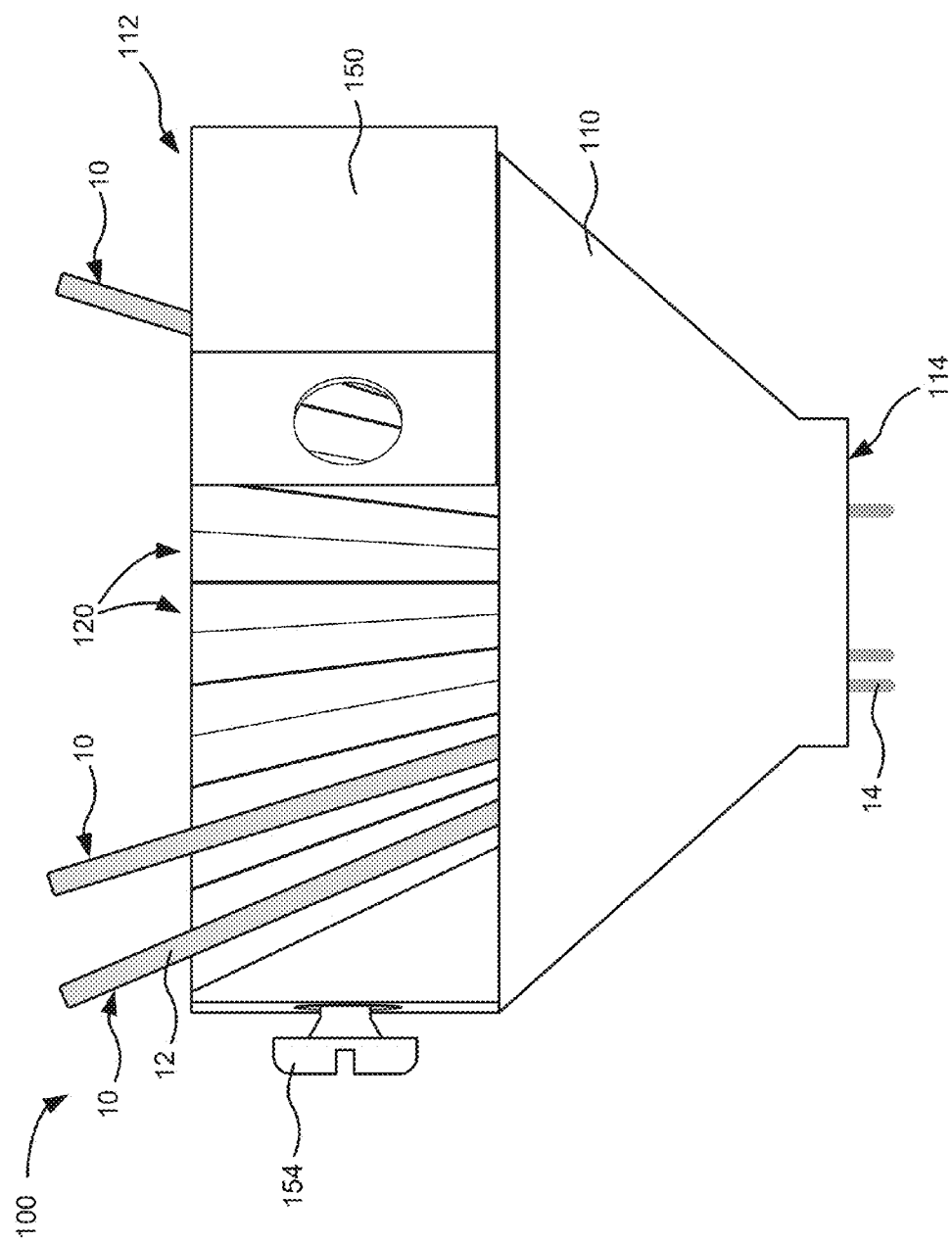
FIG. 2 is a schematic top view of the alignment fixture of FIG. 1 with a fiber lock shown in a partially open position.
Figure 3:
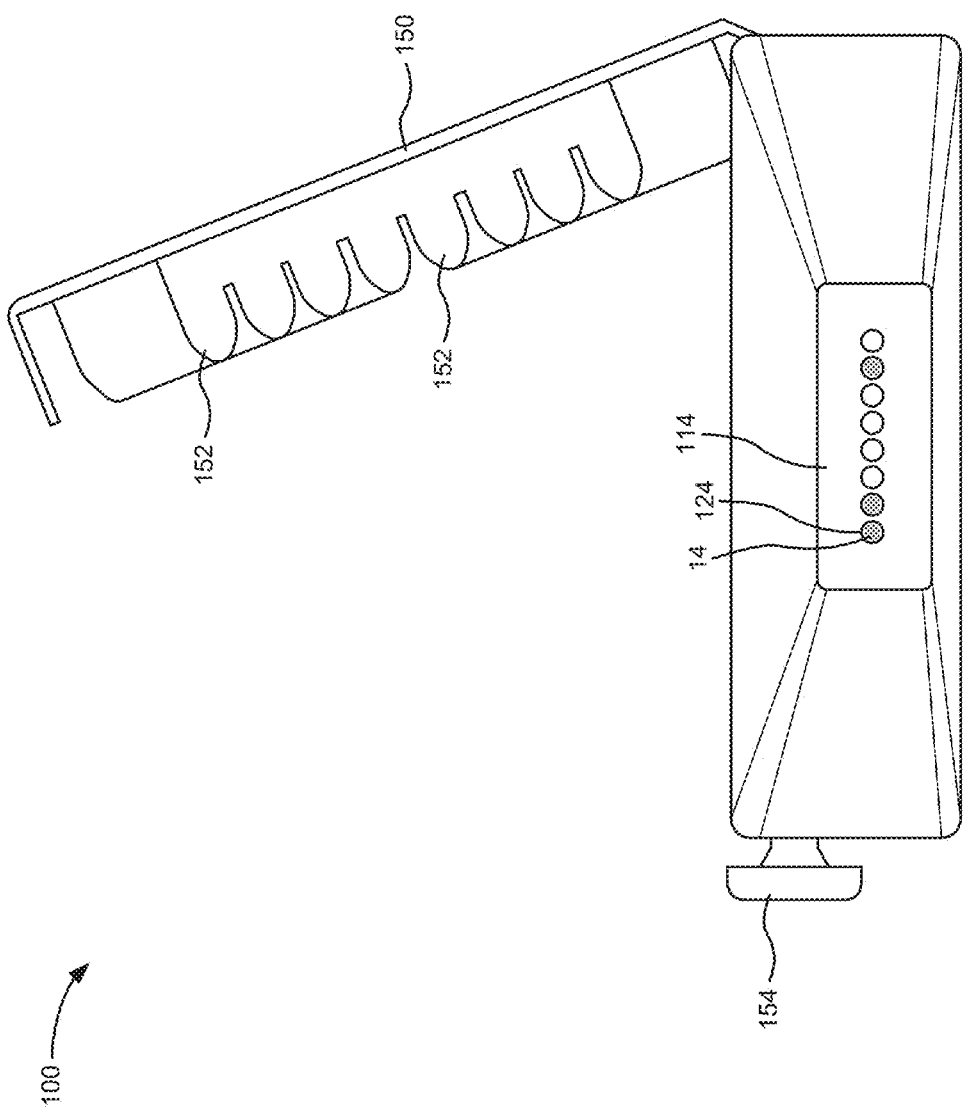
FIG. 3 is a schematic front view of the alignment fixture of FIG. 1 with the fiber lock shown in the partially open position.
Figure 4:
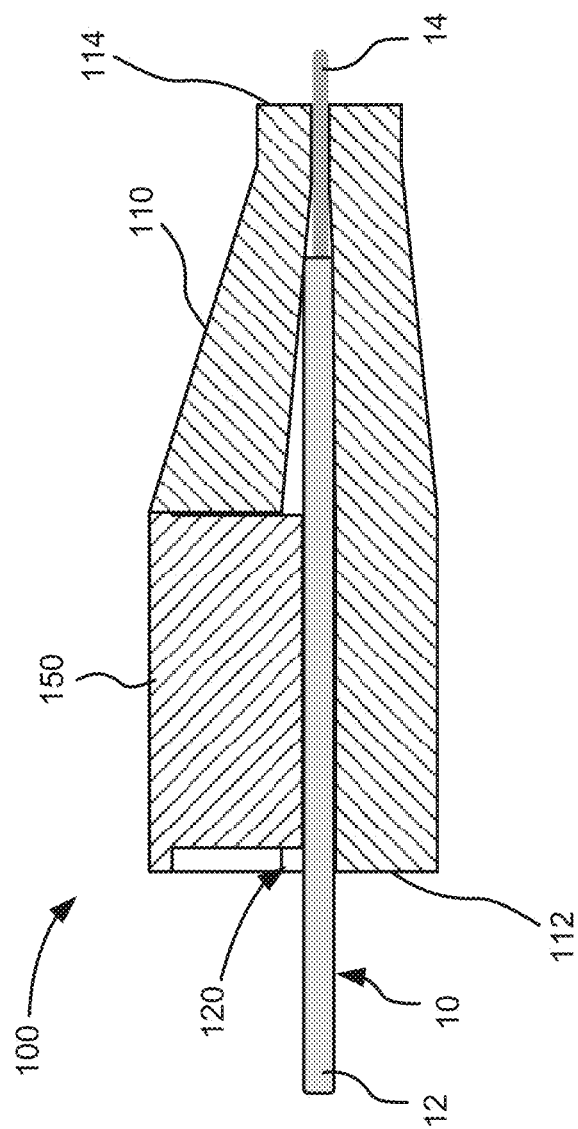
FIG. 4 is a schematic side cross-sectional view of the alignment fixture of FIG. 1 with the fiber lock shown in a closed position.

FIG. 2 is a schematic top view of alignment fixture 100 with a fiber lock 150 in a partially open position; while FIG. 3 is a schematic front view of alignment fixture 100 with fiber lock 150 in the same partially open position. FIG. 4 is a schematic side cross-sectional view of alignment fixture 100 with fiber lock 150 in a closed position; while FIG. 5 is a schematic back end view of alignment fixture 100 with fiber lock 150 in the same closed position.

Figure 5:
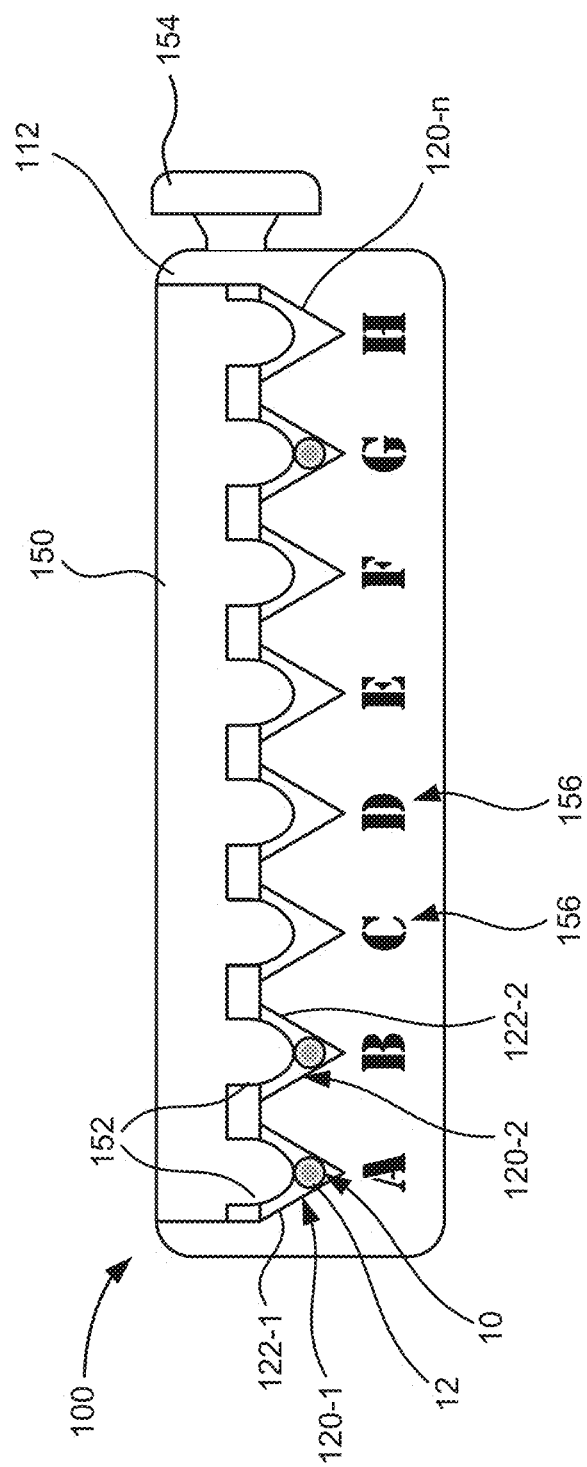
FIG. 5 is a schematic back end view of the alignment fixture of FIG. 1 with the fiber lock shown in the closed position.

Referring to FIGS. 2-5, fiber lock 150 may be included in alignment fixture 100 to secure optical fibers 10 within channels 120. Particularly, fiber lock 150 may secure coating 12 of optical fibers 10 within channels 120 such that the bare fibers 14 of optical fibers 10 remain in an aligned position at the respective exit points 124. In one implementation, fiber lock 150 may take the form of a hinged cover that may engage optical fibers 10 within each channel 120 when fiber lock 150 is closed over a portion of body 110. Fiber lock 150 may generally be configured in any shape that causes fiber lock 150 to engage optical fibers 10 within channels 120 when fiber lock 150 is in a closed position, such as shown in FIGS. 4 and 5. In one implementation, fiber lock 150 may include protrusions 152 (FIG. 3) that extend into channels 120 to center optical fibers 10 within channels 120. In another implementation, the depth of channels 120 may be shallower than shown in, for example, FIG. 5, in one or more sections of each channel 120 such that fiber lock 150 may engage optical fibers 10 in a closed position without using protrusions 152 for individual channels 120.

Each channel 120 may include a cross-sectional shape configured to promote insertion and alignment of optical fibers 10. In one implementation, as shown in FIG. 5, for example, channel 120 may include a V-shaped cross-section along the bottom of channel 120, along a least a portion of the length of channel 120, to promote positioning of fiber 10 within the center of channel 120.

When closed onto body 110, fiber lock 150 (e.g., protrusions 152) may, for example, force optical fibers 10 down into the center of a V-shaped channel 120. Fiber lock 150 may be secured in a closed position (e.g., in contact with the coating 12 of installed optical fibers 10) using a fastener 154, such as a screw, a clip, a latch, or another method of attachment. In still other implementations, fiber lock 150 may be a separate piece from body 110 that may be secured to body 110 with multiple fasteners.

Although shown in FIGS. 2-5 as positioned such that one side of fiber lock 150 is aligned with fiber insertion end 112, in other implementations fiber lock 150 may be positioned in a different location with respect to fiber insertion end 112. For example, fiber lock 150 may be positioned anywhere between fiber insertion end 112 and fiber alignment end 114 where fiber lock 150 may engage coatings 12 of optical fibers 10.

Referring to FIG. 5, fiber insertion end 112 may include labels 156 to identify particular channels. In one implementation, labels 156 or markings may be molded into body 110 near the insertion point 122 of each corresponding channel 120 at fiber insertion end 112. Labels 156 may be readable by a technician, for example, with magnification. In other implementations, labels or markings (not shown) corresponding to labels 156 may be included near the exit point 124 of each channel 120 at fiber alignment end 114. In still other implementations, labels 156 may omitted where the arrangement of channels 120 in body 110 provides a clear correlation between insertion points 122 and exit points 124.

Figure 6:
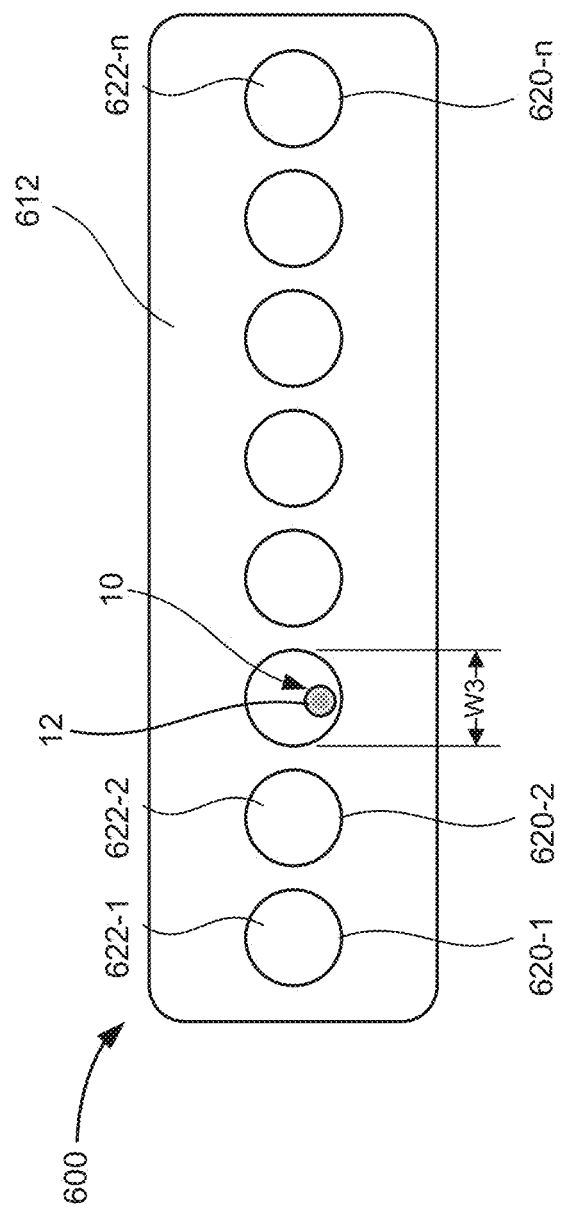
FIG. 6 is a schematic back end view of another alignment fixture according to implementation described herein.

FIG. 6 provides a simplified back end view of an alignment fixture 600 according to another implementation described herein. Generally, alignment fixture 600 may be configured similarly to alignment fixture 100 described above in that the width of channels 620 may taper from a relatively large insertion point 622 to a smaller exit point at a fiber alignment end (not shown) where optical fibers 10 may be aligned in a particular arrangement (e.g., a ribbon arrangement) with small tolerances. However, as shown in FIG. 6, alignment fixture 600 may include a fiber insertion end 612 with circular or elliptical insertion points 622 (herein referred to collectively as "insertion points 622") for channels 620 (herein referred to collectively as "channels 620"). Each channel 620 may have a width, W3, at insertion point 622. Where insertion point 622 is circular, width W3 may correspond to a cross-sectional diameter of channel 620 at insertion point 622. Where insertion point 622 is elliptical, width W3 may correspond to the minor axis (or conjugate diameter) of the elliptical cross-section of channel 620 at insertion point 622. Width W3 may be two, three, or more times the cross-sectional diameter of coating 12 of optical fiber 10. In one implementation, optical fibers 10 may be secured within channels 720 using epoxy or another adhesive material. Thus, a separate fiber lock (e.g., fiber lock 150) may not be required with fixtures (e.g., fixtures 100, 600, etc.) in some implementations.

Figure 7:
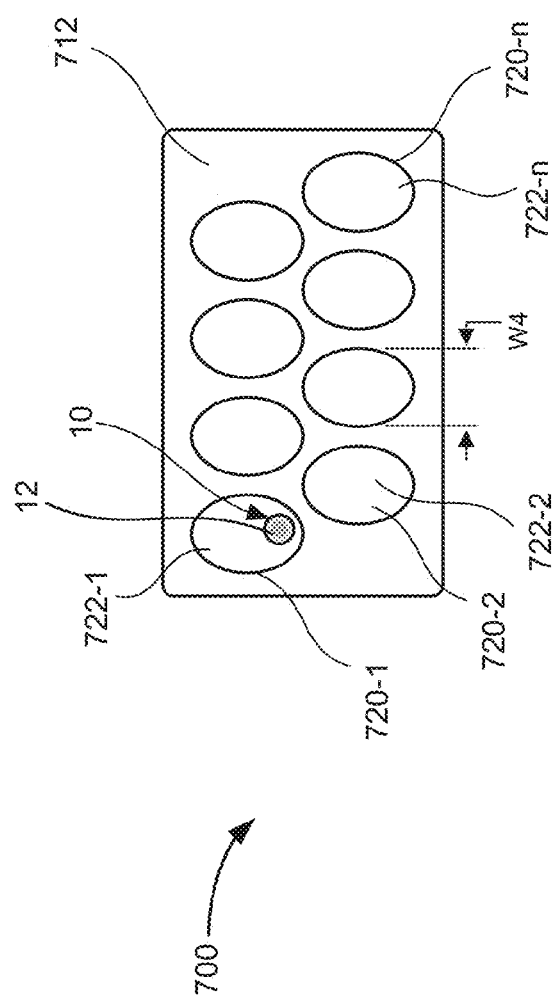
FIG. 7 is a schematic back end view of still another alignment fixture according to implementation described herein.

FIG. 7 provides a simplified back end view of an alignment fixture 700 according to another implementation described herein. Generally, alignment fixture 700 may be configured similarly to alignment fixture 100 described above in that channels 720 may taper from a relatively large insertion point 722 to a smaller exit point at a fiber alignment end (not shown) where optical fibers 10 may be aligned in a particular arrangement (e.g., a ribbon arrangement) with small tolerances. Bare fibers 14 of optical fibers 10 may extend through the exit points at a fiber alignment end for further optical and/or splicing operations. In one implementation, alignment fixture 700 may include a single horizontal ribbon arrangement at a fiber alignment end (e.g., similar to fiber alignment ends 114 of FIG. 3 or 814 of FIG. 8 described below). In another implementation, alignment fixture 700 may include a double horizontal ribbon arrangement at a fiber alignment end (e.g., similar to fiber alignment end 914 of FIG. 9 described below). However, as shown in FIG. 7, alignment fixture 700 may include a fiber insertion end 712 with insertion points 722-1 through 722-n (herein referred to collectively as "insertion points 722") of channels 720-1 through 720-n (herein referred to collectively as "channels 720") in a compressed horizontal arrangement (as shown in the orientation of FIG. 7). More particularly, alignment fixture 700 may include a compressed arrangement of insertion points 722 to minimize the overall width of alignment fixture 700.

The particular compressed arrangement of insertion points 722 in fiber insertion end 712 is shown for simplicity. Other non-liner arrangements of insertion points 722 may be used to reduce the required width of fiber insertion end 712. In some implementations, the compressed arrangement of insertion points 722 may require a different configuration of a fiber lock (e.g., fiber lock 150) to secure optical fibers 10 within channels 720. For example, in the configuration shown in FIG. 7, it may be desirable to use two separate fiber locks (e.g., a top and a bottom fiber lock) to engage optical fibers 10 in each channel 720. In another implementation, epoxy or another adhesive material may be applied to secure optical fibers 10 within channels 720.

Each channel 720, at insertion point 722, may have a circular cross-section, an elliptical cross-section (as illustrated in FIG. 7), a triangular cross-section, a hexagonal cross-section, or another shape of cross-section that is generally sized to provide an opening with sufficient clearance to permit a technician to easily guide fiber 10 into channel 720. In some implementations, some insertion points 722 may have different shapes than other insertion points 722 to permit a more condensed arrangement of insertion points 722.

Each channel 720 may have a width, W4, at insertion point 722. Where insertion point 722 is elliptical, for example, width W4 may correspond to the minor axis of the elliptical cross-section of channel 720 at insertion point 722. Where insertion point 722 is circular, width W4 may correspond to a cross-sectional diameter of channel 720 at insertion point 722. Width W4 may be two, three, or more times the cross-sectional diameter of coating 12 of fiber 10. In one implementation, labels (e.g., such as labels 156 of FIG. 5) or markings may be used to provide correlation between insertion points 722 and exit points at a fiber alignment end (not shown) of alignment fixture 700.

Figure 8:
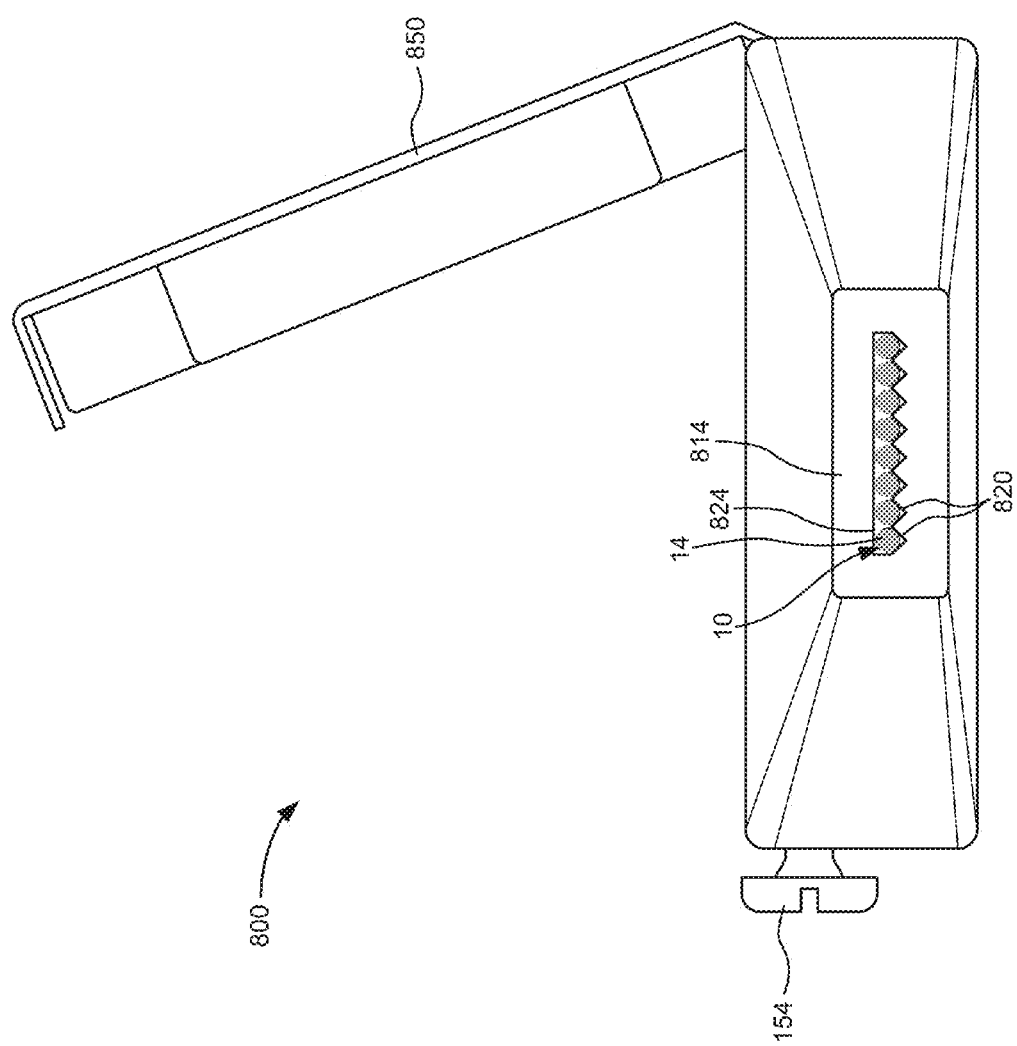
FIG. 8 is a schematic front end view of yet another alignment fixture according to an implementation described herein.

FIG. 8 provides a simplified front end view of an alignment fixture 800 according to another implementation described herein. Generally, alignment fixture 800 may be configured similarly to alignment fixture 100 described above in that channels 820 may taper from relatively large insertion points (not shown) to smaller exit points 824 at a fiber alignment end 814, where bare fibers 14 of optical fibers 10 may be aligned in a particular arrangement (e.g., a ribbon arrangement) with small tolerances. However, as shown in FIG. 8, fiber alignment end 814 may include V-shaped exit points 824 for channels 820.

In one implementation, the depth of the "V" in channels 820 may be smaller than the diameter of the optical fibers 10. Thus, fiber lock 850 may differ from fiber lock 150 in that individual protrusions 152 (FIG. 3) would not be necessary for fiber lock 850 to engage coatings 12 (not visible in FIG. 8) of optical fibers 10 when fiber lock 850 closes over channels 820.

Figure 9:
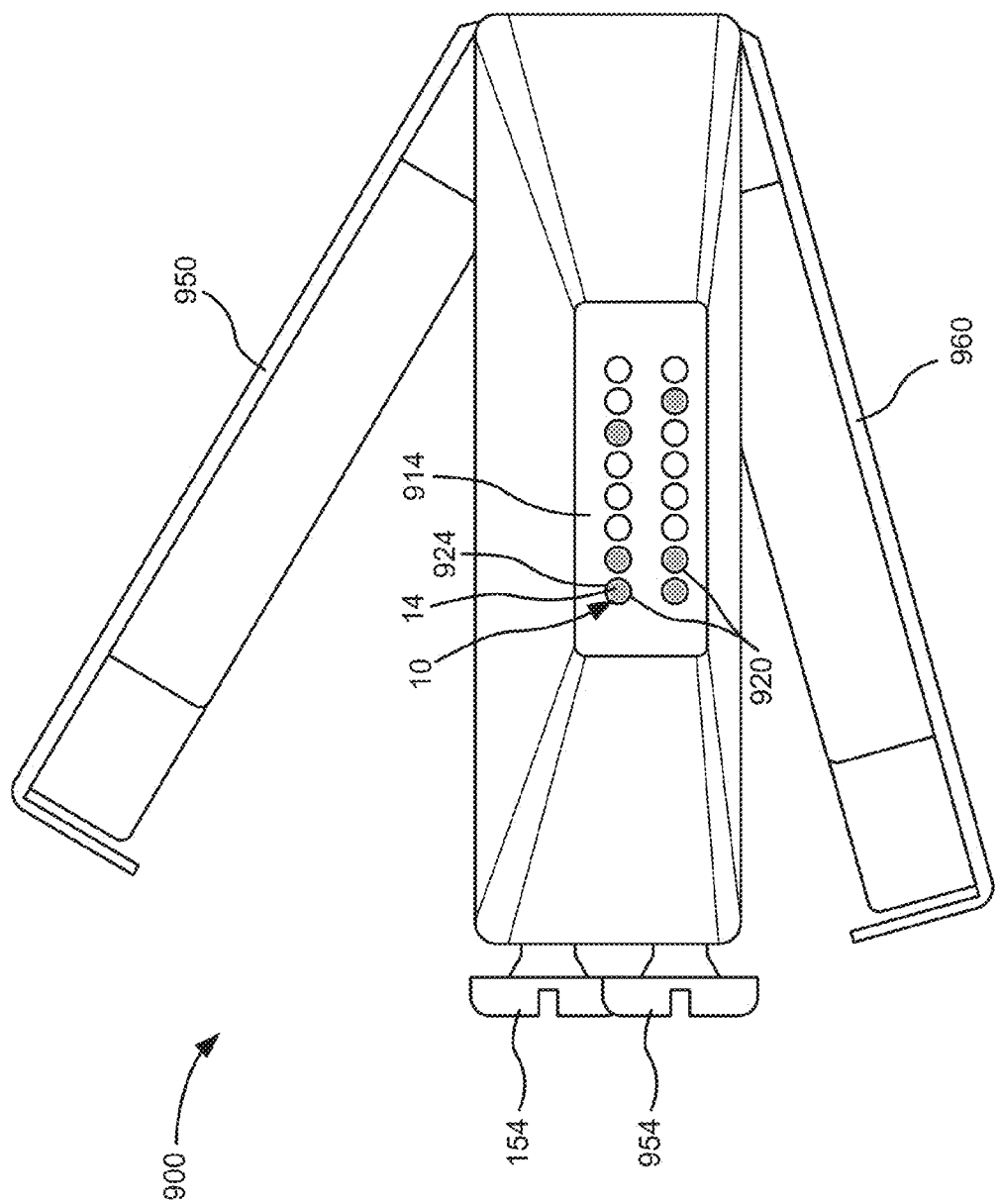
FIG. 9 is a schematic front end view of a further alignment fixture according to an implementation described herein.

FIG. 9 provides a simplified front end view of an alignment fixture 900 according to another implementation described herein. Generally, alignment fixture 900 may be configured similarly to alignment fixture 100 described above in that channels 920 may taper from relatively large insertion points (not shown) to smaller exit points 924 at a fiber alignment end 914, where bare fibers 14 of optical fibers 10 may be aligned in a particular arrangement (e.g., a ribbon arrangement) with small tolerances. As shown in FIG. 9, fiber alignment end 914 may include a double horizontal ribbon arrangement with two parallel rows of exit points 924. In one implementation, as shown in FIG. 9, a separate top fiber lock 950 and bottom fiber lock 960 (with respective fasteners 154 and 954) may be used to secure optical fibers 10 within alignment fixture 900. In other implementations, a single fiber lock or other techniques (e.g., epoxy) may be used to secure fibers 10 within channels 920.

Optical fibers 10 inserted through alignment fixtures disclosed herein may be provided such that bare fibers 14 may be positioned in a ribbon arrangement where the fibers can be converted into a multi-fiber connector. Bare fibers 14 may be cleaved in a single group and aligned, for example, for a ribbon splice with another multi-fiber ribbon. When splicing, the cleaved ribbon fibers from both ribbon arrangements may be aligned, for example, on a grooved substrate, where the spacing between the grooves of the substrate is equal to the spacing between the fibers extending from the alignment fixture (e.g., alignment fixtures 100, 600, 700, 800, 900, etc.). The alignment fixture may align and secure the individual fibers in place to ease the fiber alignment process and increase reliability of both fusion and mechanical splicing.

Figure 10:
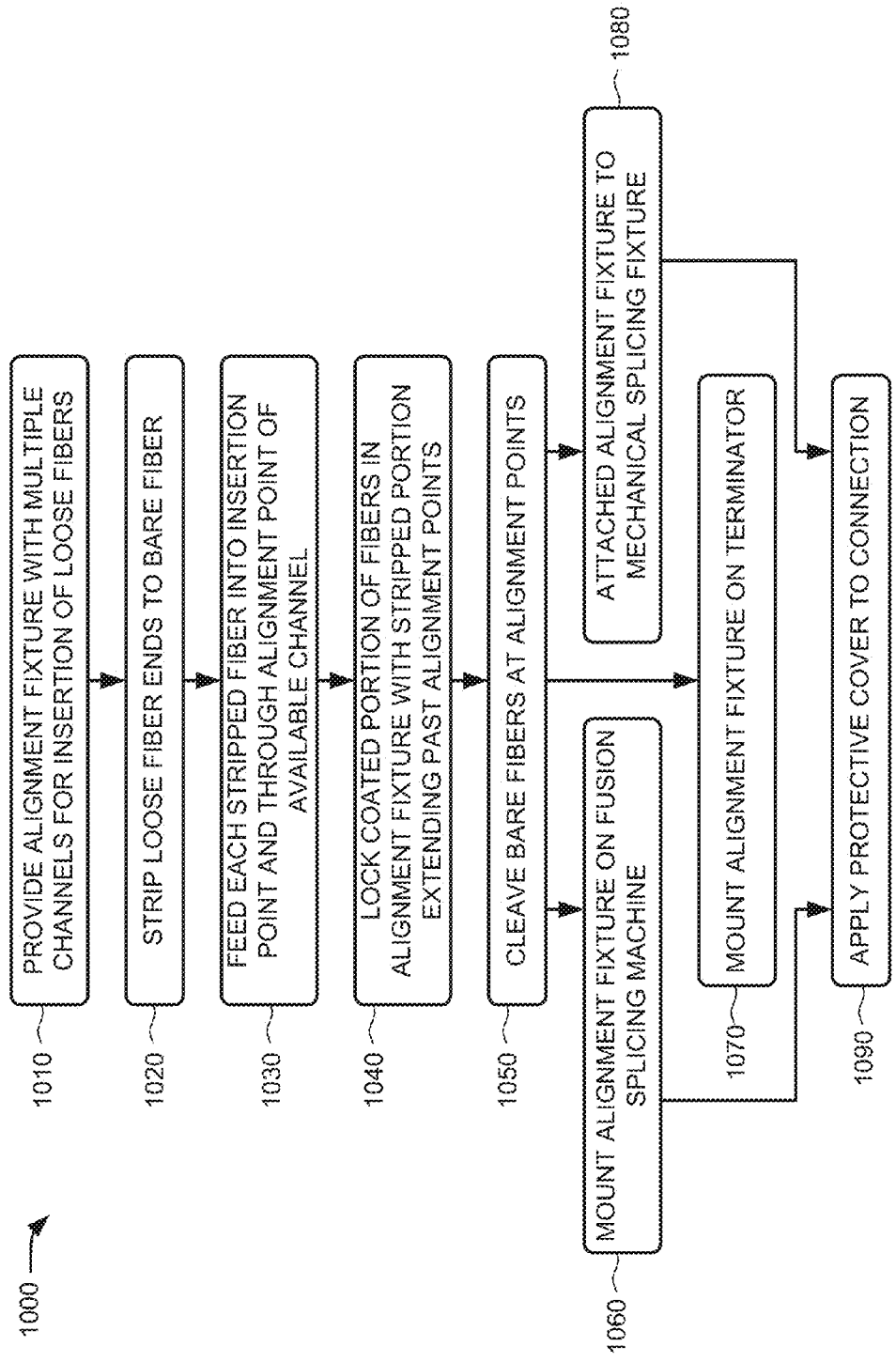
FIG. 10 is a flow chart of a process for using an alignment fixture to transition from a group of loose fibers to a multi-fiber ribbon according to an implementation described herein.

FIG. 10 is a flow chart of a process for using an alignment fixture to transition from a group of loose fibers to a multi-fiber ribbon according to an implementation described herein. Although described below primarily in the context of alignment fixture 100, process 1000 may be applicable to any of the alignment fixtures described above. Process 1000 may include providing an alignment fixture including multiple channels for insertion of loose fibers (block 1010). For example, as described above in connection with FIGS. 1-5, an alignment fixture 100 may include a body 110 with multiple channels 120 to receive optical fibers 10. Channels 120 may extend though body 110 from insertion end 112 to fiber alignment end 114.

Process 1000 may further include stripping loose fiber ends to bare fiber (block 1020), and feeding the stripped, loose fiber into an insertion point of an available channel at one end of the alignment fixture and through an alignment point at an opposite end of the alignment fixture (block 1030). For example, any protective coating 12 around the end portion of the optical fiber 10 that is to be used with fixture 100 may be removed via mechanical tools or via chemical-based and/or hot air-based stripping processes. In one implementation, stripping may include removing a cable sheath and buffer tubes from the loose fiber and cleaning any gel from the fiber strand. Each loose fiber may be stripped, for example, for a sufficient length (e.g., one inch or more) to have the stripped portion (e.g., bare fiber 14) extend through alignment fixture 100 and past exit points 124 to permit for cleaving, splicing, and/or terminating of optical fibers 10 outside of fixture 100. Each of the individual stripped optical fibers 10 may be inserted into a respective channel 120 of fixture 100. Particularly, each fiber 10 may be inserted at an insertion point 122 for a respective channel and fed through body 110 to extend past exit point 124. In one implementation, alignment fixture 100 may align up to twelve optical fibers 10.

Process 1000 may also include locking the coated portion of the fibers in the alignment fixture with the stripped portions extending past the alignment points (block 1040) and cleaving the fibers extending through the alignment point (block 1050). For example, with bare fibers 14 of optical fibers 10 extending through exit points 124, fiber lock 150 may be closed over coating 12 sections of optical fibers 10 in a portion of channels 120 to secure optical fibers 10 in alignment fixture 100. The bare fibers 14 that extend through exit points 124 may be inserted in to a cleaving machine and simultaneously cut by the cleaving machine to create a flat end surface for the aligned optical fibers 10.

Process 1000 may further include one or more of: mounting the alignment fixture with the cleaved fibers on a fusion splicing machine (block 1060), mounting the alignment fixture with the cleaved fibers on a terminator (block 1070), and attaching the alignment fixture with the cleaved fibers to a mechanical splicing fixture (block 1080). For example, after cleaving, the aligned optical fibers 10 in alignment fixture 100 are in condition for one or more additional operations. As one option, the aligned optical fibers 10 in alignment fixture 100 may be spliced to another ribbon fiber, which may be, for example, another set of fibers aligned using another alignment fixture 100. In one aspect, a splicing machine may be configured to perform a fusion splice for the aligned optical fibers 10 in alignment fixture 100. For example, alignment fixture 100 may be put onto a splicing machine that is configured to receive alignment fixture 110 with the aligned fibers. As another option, alignment fixture 100 with the aligned optical fibers 10 may be attached to a terminator, such as an MPO-compatible terminator for direct termination of ribbon cables (e.g., to prevent reflection of light in unused fiber connector ports). As still another option, alignment fixture 100 with the aligned optical fibers 10 may be connected to another fixture that provides a mechanical splice.

Process 1000 may further include applying a protective cover to the connection (block 1090). For example, an epoxy cover may be used over the alignment fixture and splice (e.g., either fused or mechanical) to secure the splice and protect from contamination and/or water migration. In other implementations, other cover types may be used.

As described above, systems and methods may provide for easier alignment of individual fibers for a multi-fiber connection. An alignment fixture is provided with a first end having large individual fiber holes tapering to ribbon alignment at the opposite end. Ends of individual optical fibers may be stripped to bare fibers and slid through the large individual fiber holes of the alignment fixture. When the fibers are pushed through and the bare fibers extend out the opposite end in a ribbon alignment, the fibers may be locked in place, properly arranged for splicing or other operations. The arranged fibers may be cleaved and inserted into a ribbon splice machine for splicing. The fixture and resulting splice may be covered together to provide permanent protection for the splice.

Systems and methods described herein may simplify alignment of loose fibers for ribbonization and simplify multi-fiber splicing operations in the field. Systems and methods described herein may also provide easier transitioning from loose fibers to MPO-type terminations. Use of the alignment fixture disclosed herein may increase the reliability of fusing or mechanical splicing and provide addition protection for completed splices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 10, the order of the blocks may be modified in other implementations. Further, non-dependent blocks may be performed in parallel.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. An alignment fixture, comprising:
 a body configured to receive a plurality of optical fibers with each of the plurality of optical fibers having a coated portion and a bare fiber end, the body including:
   a first end configured to permit insertion of the plurality of optical fibers into the body;
   a second end configured to align the bare fiber ends of the plurality of optical fibers in a particular arrangement; and
   a plurality of channels extending from the first end to the second end, each of the plurality of channels including:
     an insertion point at the first end to receive one of the plurality of optical fibers, wherein a width of the insertion point is at least twice a diameter of the coated portion of the one of the plurality of optical fibers, an exit point at the second end, wherein the exit point is configured to position the bare fiber end of the one of the plurality of optical fibers in the particular arrangement within a desired tolerance relative to other bare fiber ends of the plurality of optical fibers, and wherein a width of the exit point is less than twice a diameter of the bare fiber end of the one of the plurality of optical fibers, and a middle portion between the insertion point and the exit point, a width of the middle portion gradually tapering from the width of the insertion point to the width of the exit point.

2. The alignment fixture of claim 1, wherein the middle portion includes a stopping point for insertion of the one of the plurality of optical fibers wherein the width of the middle portion at the stopping point matches the diameter of the coated portion of the one of the plurality of optical fibers.

3. The alignment fixture of claim 1, further comprising:
a fiber lock to secure the plurality of optical fibers near the first end, wherein the fiber lock includes a cover to contact each of the coated portions of the plurality of optical fibers and secure each of the plurality of optical fibers within one of the plurality of channels when the cover is closed over a portion of the body.

4. The alignment fixture of claim 3, wherein the fiber lock includes individual protrusions that extend into each of the plurality of channels to engage each of the coated portions of the plurality of optical fibers when the cover is closed.

5. The alignment fixture of claim 1, wherein the exit points position the bare fiber ends of the plurality of optical fibers in a ribbon arrangement.

6. The alignment fixture of claim 1, wherein the first end includes a label at the insertion point to correlate the insertion point with the exit point.

7. The alignment fixture of claim 1, wherein the exit point is configured to position a 125 micron diameter bare fiber.

8. The alignment fixture of claim 1, wherein the body comprises a molded thermoplastic polymer.

9. The alignment fixture of claim 1, wherein the particular arrangement corresponds to a 12 fiber multi-fiber push-on (MPO) ribbon arrangement.

10. The alignment fixture of claim 1, wherein the particular arrangement corresponds to a 24 fiber multi-fiber push on (MPO) arrangement with two parallel rows.

11. A method, comprising:
providing multiple loose optical fibers, each of the multiple loose optical fibers having a coated portion;
stripping the coated portion from an end portion of each of the multiple loose optical fibers to create bare fiber ends, wherein the stripping includes stripping each of the multiple loose optical fibers a sufficient length to extend the bare fiber ends through an alignment fixture;
providing the alignment fixture for the multiple loose optical fibers, wherein the alignment fixture includes:
a body including a first end configured to permit insertion of the multiple loose optical fibers into the body, a second end configured to align the bare fiber ends of the multiple loose optical fibers in a particular arrangement, and multiple channels extending from the first end to the second end, and
each of the multiple channels including an insertion point at the first end to receive one of the multiple loose optical fibers, wherein a width of the insertion point is at least twice a diameter of the coated portion of one of the multiple loose optical fibers; an exit point at the second end, wherein the exit point is configured to position the bare fiber end of the one of the multiple loose optical fibers in the particular arrangement within a desired tolerance relative to other bare fiber ends of the multiple loose optical fibers, and wherein a width of the exit point is less than twice a diameter of the bare fiber end of the one of the multiple loose optical fibers; and a middle portion between the insertion point and the exit point, a width of the middle portion gradually tapering from the width of the insertion point to the width of the exit point;

feeding each of the multiple loose optical fibers into an insertion point of a different one of the multiple channels, through the alignment fixture, and past an exit point, wherein the feeding causes the bare fiber ends to align in a ribbon arrangement;

locking the coated portions of the multiple loose optical fibers in the alignment fixture;

cleaving the bare fiber ends simultaneously to create cleaved fibers; and applying one of a multi-fiber splicing operation or multi-fiber termination operation to the cleaved fibers.

12. The method of claim 11, wherein, when feeding each of the multiple loose optical fibers, the bare fiber ends are inserted past the exit point for a sufficient length to permit the cleaving, the multi-fiber splicing operation, or multi-fiber termination operation outside the alignment fixture.

13. The method of claim 11, further comprising:
applying, after the multi-fiber splicing operation, a protective cover over the alignment fixture and a splice from the splicing operation.

14. The method of claim 11, wherein the diameter of the coated portion of the multiple loose optical fibers is 250 microns.

15. The method of claim 11, wherein each of the multiple channels includes, at the insertion point, a cross-sectional width that is more than triple a diameter of the coated portion of the multiple loose optical fibers.

16. The method of claim 11, wherein the ribbon arrangement corresponds to a standard 12-fiber multi-fiber push-on (MPO) arrangement.

17. The method of claim 11, wherein locking the coated portions of the multiple loose optical fibers in the alignment fixture includes securing a locking cover over an exposed portion of the multiple channels.

18. A method, comprising:
stripping end portions of multiple loose optical fibers to create stripped fibers having a particular coated portion diameter and a particular bare fiber diameter;
providing an alignment fixture for the stripped fibers, wherein the alignment fixture includes:
a body including a first end configured to permit insertion of the loose optical fibers into the body, a second end configured to align bare fiber ends of the loose optical fibers in a particular arrangement, and a multiple channels extending from the first end to the second end, and
each of the multiple channels including an insertion point at the first end to receive one of the multiple loose optical fibers, wherein a width of the insertion point is at least twice a diameter of the coated portion of one of the multiple loose optical fibers; an exit point at the second end, wherein the exit point is configured to position the bare fiber end of the one of the multiple loose optical fibers in the particular arrangement within a desired tolerance relative to other bare fiber ends of the multiple loose optical fibers, and wherein a width of the exit point is less than twice a diameter of the bare fiber end of the one of the multiple loose optical fibers; and a middle portion between the insertion point and the exit point, a width of the middle portion gradually tapering from the width of the insertion point to the width of the exit point;

feeding each of the stripped fibers into the insertion point of a different one of the multiple channels, wherein the feeding further comprises pushing each of the stripped fibers through the alignment fixture and past one of the exit points, and wherein the feeding causes the bare fiber ends of the stripped fibers to align in a ribbon arrangement at the exit point; and locking the stripped fibers within the alignment fixture.

19. The method of claim 18, further comprising:

cleaving the bare fiber ends of the stripped fibers simultaneously to create cleaved fibers; and applying one of a multi-fiber splicing operation or multi-fiber termination operation to the cleaved fibers.

20. The method of claim 18, wherein the stripping includes stripping a coating from each of the multiple loose optical fibers for a sufficient length to extend the bare fiber ends of the stripped fibers through the alignment fixture.

* * * * *